Oct. 30, 1956     C. G. KEPPLE ET AL     2,768,923
THERMOSET SYNTHETIC RESIN LAMINATE WITH UNDERCUT
SURFACE AND METHOD OF MAKING SAME
Filed June 19, 1953

WITNESSES:
John E. Healy
Wescott B. Northam

INVENTORS
Charles G. Kepple &
William C. Weltman
BY
ATTORNEY

United States Patent Office 2,768,923
Patented Oct. 30, 1956

2,768,923

THERMOSET SYNTHETIC RESIN LAMINATE WITH UNDERCUT SURFACE AND METHOD OF MAKING SAME

Charles G. Kepple and William C. Weltman, Pittsburgh, Pa., assignors to Westinghouse Electric Corporation, East Pittsburgh, Pa., a corporation of Pennsylvania Application June 19, 1953, Serial No. 362,936

6 Claims. (Cl. 154—106)

This invention relates to a thermosetting synthetic resinous laminate having a novel roughened surface and process for preparing the same, and is a continuation-in-part of our application Serial No. 265,886, filed January 10, 1952, now Patent No. 2,663,663.

The laminate of this invention is particularly suited for use as a base in printed electrical circuits. Circuits are defined as being "printed" when a conducting layer of material, usually a metal coating, is applied in a desired pattern on an insulated surface by a suitable process.

In the use of printed electrical circuits, a serious problem has arisen with respect to adequate adherence of the conducting material to the base laminate. Due to the different physical and chemical natures of the conductive metal and insulating non-metallic laminate, there is little "natural" adhesion between the two. For this reason, it is desirable to provide a properly prepared surface on the base laminate both to increase surface area and to provide mechanical interlocking of a subsequently applied layer of metal of other conductor.

Numerous attempts to provide a surface to which the conducting material will properly adhere have not proven satisfactory. For example, sand blasting and shot blasting produce a surface of roughened texture having a series of indentations, but the indentations so formed have either generally smooth inwardly converging plane surfaces, or smooth concavities. Even with such extensive preparation of the surface, the adherence of the conducting material to the base laminate is poor, there being no indentations on which the conducting material may effectively interlock or wedge itself. Consequently, subsequently applied layers of metal can be readily peeled off, or they blister or lift due to thermal effects.

An object of this invention is to provide a resinous laminated body having a novel roughened surface texture comprising a multiplicity of minute undercut pits, pores, or indentations which paint metallic deposits, or electrically conducting materials will fill and upon hardening form a mechanical lock or bond with the surface of the laminated body.

A further object of this invention is ot provide a method for making a resinous laminated body, having an undercut roughened surface suitable for use as a base for printed electrical circuits, by imbedding finely divided granular particles in a surface of the resinous member and then leaching the granular particles from the member after it has been cured.

Another object of this invention is to provide a method for producing a roughened surface in a thermoset synthetic resinous laminated member by adherently applying a uniform layer of finely divided granular particles to a sheet that is to form the surface sheet of the laminated member, by means of a thin film of a novel adhesive resin and subsequently molding the laminated member with the granular treated sheet forming the surface sheet thereof in a manner such that the granular particles are imbedded therein with only the outer portions of the particles being exposed, and then leaching the granular particles from the laminated member, thereby forming a multiplicity of minute, undercut indentations in the surface thereof.

A still further object of this invention is to provide a novel adhesive phenolic resin, the surface of which will remain wet for a sufficient length of time after exposure to air to facilitate ready adherence thereto of finely divided granular particles, the resin comprising a critical ratio of phenol, formaldehyde, and one or more thermoplastic rosin esters.

Other objects of the invention will in part be obvious and will in part appear hereinafter.

For a better understanding of the nature and objects of the invention, reference should be had to the following detailed description and drawing, in which.

Figure 3:
Figure 4:
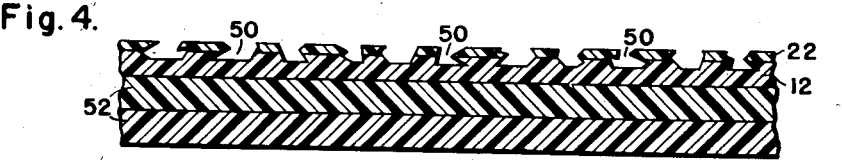

Fig. 3 is a magnified fragmentary transverse sectional view of a portion of a laminate showing the fibrous surface sheet advanced to final C stage under heat and pressure illustrating the granular particles imbedded in the sheet; and Fig. 4 is a magnified fragmentary transverse sectional view of a laminate showing the fibrous surface sheet after the finely divided granular particles have been removed.

We have discovered procedures and materials by which a roughened surface comprising innumerable closely spaced, minute undercut indentations may be readily produced in a thermoset synthetic resinous laminate. The process comprises imbedding in the surface sheet of the laminate, during the molding operation, a layer of a finely divided, sharp-angled granular material which granular material may be thereafter dissolved out. After molding and curing the laminate embodying such surface sheet, the partially exposed crystalline material is then leached or dissolved therefrom, leaving a roughened surface in which there are closely spaced, minute undercut indentations.

The process of partially imbedding the granular particles in the laminate is acomplished by applying a thin film of adhesive resin by any suitable means such as rolls or spraying to the outermost surface of a fibrous sheet previously impregnated with a phenolic resin advanced well into the B stage. While the adhesive resin is still wet, a layer of the finely divided, sharp-angled granular particles are distributed on the adhesive film. The amount and size of granular particles used will depend upon the particular surface desired. The sheet with its wet adhesive film and applied granular particles is passed through an oven to dry the sheet to a tack-free condition. This prepared sheet is then cut to size and used as a top surface sheet for a laminated body, the laminated body being molded in such a manner that a small upper portion of each of the granular particles remains exposed after the molding operation. This is accomplished by controlling the degree of flow of the resin during the molding operation which will be hereinafter described.

The size and spacing of the identations in the final laminate will depend upon the size and amount of crystalline material imbedded in the surface sheet of the laminate Satisfactory results have been obtained using granular particles of a fineness that will pass through screens having from 100 to 320 meshes per lineal inch. A 100 mesh screen will provide particles with dimensions of less than 6 mils, while a 320 mesh screen will provide particles with dimensions of less than 2 mils. For printed circuit applications, it is desirable, however, to maintain the particle size at dimensions no greater than 6 mils. The particles should be applied to the surface in an amount sufficient to provide an average spacing between particles no greater than the particle size.

Particularly suitable materials for imbedding in the surface sheet of the laminate are water or acid soluble salts, metals, or oxides, such as sodium chloride, calcium carbonate and magnesium carbonate, marble, dolomite, granular aluminum, or other metals.

It has been found that finely divided crushed marble and dolomite give good results. Particles of finely divided crushed marble and dolomite have sharp angles, will retain their shape under the heat and pressure used in molding laminates, and are readily soluble in common acids, such as dilute hydrochloric acid.

The adhesive resin used to hold the granular particles to the top surface sheet prior to molding the laminated body must have special properties. The resin must retain sufficient tack when exposed to air for a period of time of up to half an hour or more to provide proper adhesion of the particles. If the applied resin varnish forms a semi-gelled surface the particles will not adhere properly thereto. Also, the varnish must have a consistency such that it can be applied in a very thin continuous coating or film. The particles must adhere to this film but not be covered thereby. Furthermore, the resin must have an extended B stage so that it may be dried to a very low volatile content in the drying oven without appreciably converting into the C stage. It must maintain moldability with practically zero flow, that is, have very low greenness, so that it does not cover the particles during the molding operation.

The following novel phenolic resin has the above-mentioned properties whereby it is unusually well suited for use as the adhesive varnish. This phenolic resin comprises the reaction product of a mixture of from 75% to 25% by weight of phenol, and from 25% to 75% by weight of a phenol selected from at least one of the groups consisting of cresol and cresylic acid, from 5% to 20% by weight based on the total weight of the phenols, of one or more thermoplastic rosin esters, and from 1 to 2 moles of an aldehyde per mole of the phenols. The aldehyde is selected from the group consisting of formaldehyde, polymers of formaldehyde and compounds engendering aldehyde such as hexamethylene tetramine, and mixtures of two or more of these. The solvent for the resulting resin is n-butyl alcohol or a similar alcohol, alone or admixed with toluene, or other solvent boiling in the range of from 100° C. to 135° C. A number of thermoplastic rosin esters may be used, such as glycol or glycerol esters of rosins, and methyl esters of abietic acid such as methyl abietate and methyl hydrogen abietate.

The resin is prepared by charging phenol, aldehyde and ½% by weight of ammonia (28% aqueous solution) as a catalyst into a reaction vessel equipped with a mechanical stirrer, thermometer and a reflux condenser. The reaction vessel is heated to bring the contents to a boiling temperature and then refluxed for 30 minutes. The rosin ester and cresylic acid are then added, and the mixture is refluxed for an additional hour. This reaction product is treated under vacuum of 22 to 24 inches of mercury with heat applied until the temperature rises to 100° C. to 110° C., at which time the solvent is added in an amount to produce about a 50% resin solids solution and the resinous varnish is allowed to cool.

It is to be understood that other adhesive resins may be used provided they have the above-mentioned desirable properties and are compatible with other impregnating resins used.

The amount of this adhesive resin varnish applied to form a film on a sheet previously impregnated with a suitable phenolic resin and cured to the B stage, is varied according to the particle size and amount of particles required for the particular surface desired. For example, with dolomite, of a particle size of from 180 to 240 mesh, generally requires ½ pound to ¾ pound of the resin (solvent free) per ream having 4½ to 5 pounds of the dolomite particles. For finer dolomite particles of from 240 mesh to 320 mesh, substantially ½ pound of adhesive resin is used for each 2½ pounds to 3 pounds of the particles.

A ream is defined as the area of a sheet having a width of 37 inches and a length of 33 yards.

In order that the flow of resin may be controlled during the molding operation so that the granular particles are not covered, the degree of advancement of the previously applied B stage phenolic resin in the surface sheet is stopped at a predetermined point. This point is determined by a volatility control method. A satisfactory means for determining the degree of advancement of the resin by the volatility control method is to weigh a sample of the varnish impregnated sheet to the nearest one-hundredth of a gram. Place the sample in an oven at a temperature of 100° C. for 15 minutes and determine the weight loss, then divide the weight loss by the original weight of the sheet and multiply by 100 to calculate the percent weight loss, or percent volatile loss.

For optimum results, it has been found that the impregnated material used for the surface sheet should have a percent volatile of not more than 0.8%, as determined by this volatility control method, so that there will not be excessive resin flow during the molding operation. It is desirable to have as low a percent volatile as possible, but difficulties arise with the material becoming so brittle that cracks due to handling would be a problem. Enough flexibility must be maintained to facilitate ease in handling.

Figure 1:
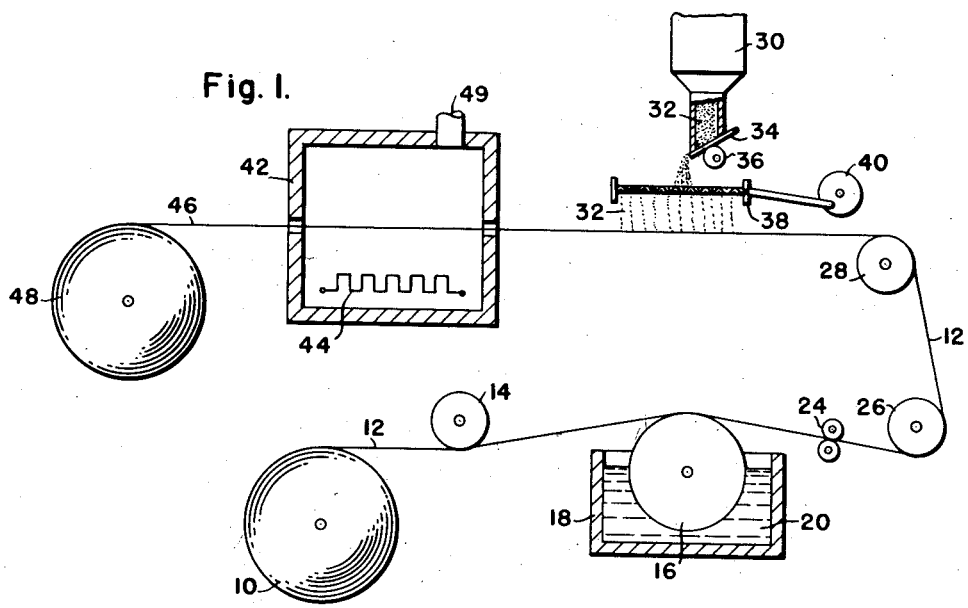
Figure 1 is a schematic view of apparatus for applying adhesive resin varnish to the surface of a sheet of fibrous material previously impregnated with a laminating varnish advanced to the B stage, applying finely divided granular particles to the wet adhesive varnish, and drying the sheet to a tack-free condition.

Referring to Fig. 1 of the drawing, a roll 10 of sheet fibrous material 12 previously impregnated to a resin ratio of 1.65 to 1.85, with a suitable phenolic resin dried to a tack-free B-stage condition, is passed under a tension roller 14 and over a film applying roller 16 disposed within a resin varnish tank 18 filled with an adhesive resin varnish 20 in the low polymeric or A stage. A wet adhesive resin coating 22 is thereby applied to one side of the sheet 12. The sheet 12 is then passed between squeeze rollers 24 to control the amount of adhesive resin coating 22 applied to the sheet. Without removing the solvent from the coating 22, the sheet 12 is then passed over guide rollers 26 and 28 and under a hopper 30 containing a supply of finely divided granular particles 32. The hopper 30 is provided with a discharge means comprising a pivoted gate member 34 actuated by a rotating eccentric 36 whereby a continuous stream of finely divided granular particles is deposited on a vibrating screen 38 actuated by eccentric 40. The purpose of the vibrating screen is to provide an even distribution of particles on the wet adhesive coating and to retain any oversize particles. The sheet 12 with its wet adhesive resin coating 22 and applied particles 32 thereon, then passes into a drying oven 42 provided with a suitable heating means such as an electrical resistance element 44. In the oven 42 the coated sheet material is dried at a predetermined temperature sufficient to dry the adhesive resin coating and advance it well into the B stage so as to prevent excessive resin flow during the molding operation. The finely divided granular particles 32 will adhere to the dried adhesive resin coating 22 on the surface of the resulting dried surface sheet 46 and may be wound into a roll 48 to await future use.

The oven 42 is provided with a stack 49 for the escape of vapors. If conditions require, a ventilating fan of any well known type (not shown), may be mounted in the stack.

It is to be understood that other suitable means for distributing the uniform layer of granular particles on the wet adhesive film may be utilized. For example, the particles may be conveyed by means of a belt to a position adjacent the adhesive covered sheet and transferred thereto by an electrostatic charge conducted to the sheet.

Figure 2:
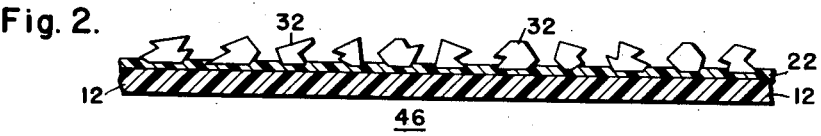
Fig. 2 is a magnified fragmentary transverse sectional view of a fibrous surface sheet impregnated with a resinous laminating varnish, an adhesive resin varnish on the surface thereof, and finely divided granular particles held to the surface of the sheet by means of the adhesive varnish.

In molding a laminated body in accordance with this invention, the prepared sheet 46, with the applied coating 22 and the particles 32 adhering thereto, as illustrated in Fig. 2 of the drawing, is taken from roll 48 and cut to a predetermined size. This prepared sheet is placed with its particle covered surface uppermost on a stack of resin impregnated sheets of the same size not covered with granular particles, the stack to be laminated into a cured unitary body. The stack to be molded comprises a plurality of body sheets impregnated with phenolic resin advanced into the B stage and a treated top sheet 46 provided with a layer of granular particles 32 as hereinbefore described. It will be understood that in making laminates, the treated sheet 46 may be applied to both the top and bottom surfaces of the stack with the particles 32 being exposed at both surfaces. The assembled stack is then molded under heat and pressure and brought to the final C stage whereby particles 32 are imbedded, with outer portions extending from the surface sheet 46, which is bonded to body sheets 52, as illustrated in Fig. 3 of the drawing.

The body sheets 52 making up the laminated body may be impregnated with any suitable thermosettable resinous varnish, depending upon the type of service to which the laminate will be subjected, including temperature requirements. Paper cloth, asbestos and glass fiber sheets impregnated with phenolics, epoxy resins, melamine resins, silicone resins, etc., may be employed. Good results have been obtained using a varnish composed of a thermosettable phenol-aldehyde resin. The body sheets were impregnated with the resin to a resin ratio of from 2.00 to 2.50. Resin ratio is defined as the weight of the sheet plus the weight of the resin to the weight of the untreated sheet.

The particles 32 are leached from the laminated body with a suitable solvent leaving a plurality of undercut minute pores, or indentations 50, as shown in Fig. 4 of the drawing. These undercut indentations 50 provide a roughened surface that a paint, electroplated or sprayed metal, or other conducting material will readily adhere to. The paint or conducting material forms a mechanical interlock with the surface of the laminate and is thus keyed thereto.

The solvent used to leach out or dissolve the crystalline particles will, of course, depend upon the material used. Acetic acid and muriatic acid are examples of acids suitable for reacting with calcium carbonate and magnesium carbonate.

The following example is exemplary of the preparation of a thermoset resinous laminate in accordance with this invention.

EXAMPLE

An adhesive phenolic resin was prepared by reacting the following ingredients as previously set forth:

| | Parts by weight |
|---|---|
| Phenol | 450 |
| Cresol | 150 |
| Aqua ammonia, 26° Bé | 9 |
| Formalin, 37% | 520 |
| Methyl abietate | 60 |

The reaction product was dissolved in 320 parts by weight of butyl alcohol.

One-half pound per ream of this adhesive resin varnish was utilized to cover the surface of a fibrous sheet impregnated with a phenolic resin dried to a tackfree, B-stage condition. On the adhesive resin film there was evenly distributed 4½ pounds per ream of 180 to 240 mesh dolomite. This particle covered sheet was passed through a drying oven and the resin advanced to 0.8% volatile condition. The prepared sheet was then cut to a predetermined size and placed at the top of a stack of body sheets impregnated to a resin ratio of approximately 2.00 with a phenol-aldehyde resin advanced well into the B stage and also cut to the same predetermined size. The stack was molded in a press at a pressure of approximately 1000 p. s. i. and a temperature of 160° C. for 45 minutes.

During the molding operation, the resin flowed around the particles, imbedding them in the body of the laminate, but leaving the top portions of the particles exposed. The particles were then readily leached from the body of the laminate with 10% dilute hydrochloric acid in a period of time of 5 minutes. After being washed with water and dried, the laminated member had a surface of roughened texture which under a microscope showed undercut indentations.

Electrically conducting materials when applied to the laminated member by any of the well known methods such as painting, spraying, vacuum sputtering, chemical deposition, and electroplating, form a mechanical interlock with the undercut indentations and pores and thus adhere thereto with great tenacity. Laminates were prepared by depositing silver thereon through a stencil and then plated with several mils of copper. The plated copper was tested by passing heavy current therethrough to reach temperatures of up to 150° C., and used in radios. No blistering, lifting or other failure was evident.

Since certain changes may be made in the above invention and different embodiments of the invention may be made without departing from the scope thereof, it is intended that all matter contained in the above description or taken in connection with the accompanying drawing shall be interpreted as illustrative and not in a limiting sense.

We claim as our invention:

1. In the method of preparing a molded thermoset resinous laminated body having a roughened surface thereon, the steps comprising impregnating a sheet which is to form a surface sheet of the laminated body with a synthetic resin varnish in the A stage to a resin ratio of 1.65 to 1.85 and drying the sheet to a tack-free condition, applying a thin coating of adhesive resin in an amount from ½ pound to 1 pound per ream to a surface of the resin impregnated sheet, distributing on the adhesive coating a uniform layer of granular particles finely divided to a size that will pass through a sieve having from about 100 to 320 meshes per lineal inch, the adhesive resin being wet due to solvent being present and in the A-stage at the time of application of said granular particles, drying the sheet to evaporate the solvent from the adhesive resin and advance the adhesive resin to a point in the B stage whereby the resins will subsequently only partially surround the granular particles during the molding operation, positioning the particle covered B-stage sheet with its particle covered surface facing outwardly on a stack of resin impregnated sheets to be laminated, subjecting the assembled sheets to heat and pressure to form a cured laminate such that the particles are imbedded in the surface of the molded laminate with the outer portions of the particles being exposed, and removing the imbedded particles by leaching with a suitable solvent, whereby there is produced a roughened surface having a multiplicity of minute undercut indentations.

2. The process of claim 1 in which the adhesive resin is a phenolic resin comprising the reaction product of a mixture of from 75% to 25% by weight of phenol, and from 25% to 75% by weight of a phenol selected from at least one of the group consisting of cresol and cresylic acid, from 5% to 20% by weight, based on the total weight of the phenols, of at least one thermoplastic rosin ester and from 1 to 2 moles of an aldehyde per mole of the phenols, the aldehyde being selected from the group consisting of formaldehyde, polymers of formaldehyde and compounds engendering formaldehyde.

3. A resinous laminated body, having an undercut roughened surface suitable for use as a base for printed electrical circuits, prepared in accordance with the method recited in claim 1.

4. A resinous laminated body, having an undercut roughened surface suitable for use as a base for printed electrical circuits, prepared in accordance with the method recited in claim 2.

5. In a resinous laminated body suitable for use as a base for printed electrical circuits, the body having a surface sheet impregnated with a synthetic resin in a resin ratio of 1.65 to 1.85, a thin coating of adhesive resin on the outer surface of the surface sheet in an amount from ½ pound to 1 pound per ream, the surface sheet having a multiplicity of minute undercut indentations extending through the adhesive film and partially into the surface sheet, the indentations having dimensions not more than 6 mils and spaced apart a distance of not more than 6 mils.

6. The resinous laminated body of claim 5 in which the adhesive resin is the reaction product of a mixture of from 75% to 25% by weight of phenol, and from 25% to 75% by weight of a phenol selected from at least one of the group consisting of cresol and cresylic acid, from 5% to 20% by weight, based on the total weight of the phenols, of at least one thermoplastic rosin ester, and from 1 to 2 moles of an aldehyde per mole of the phenols, the aldehyde being selected from the group consisting of formaldehyde and polymers of formaldehyde.

References Cited in the file of this patent

UNITED STATES PATENTS

| | | |
|---|---|---|
| 2,128,906 | Benner et al. | Sept. 6, 1938 |
| 2,380,192 | Schlaanstine | July 10, 1945 |
| 2,380,307 | Haroldson | July 10, 1945 |
| 2,380,599 | Kline | July 31, 1945 |
| 2,534,805 | Waterfield | Dec. 19, 1950 |
| 2,591,466 | Reynolds, et al. | April 1, 1952 |
| 2,663,663 | Weltman et al. | Dec. 22, 1953 |